(No Model.) 2 Sheets—Sheet 2.
S. F. STAFFORD.
BEAN THRASHING MACHINE.
No. 547,189. Patented Oct. 1, 1895.
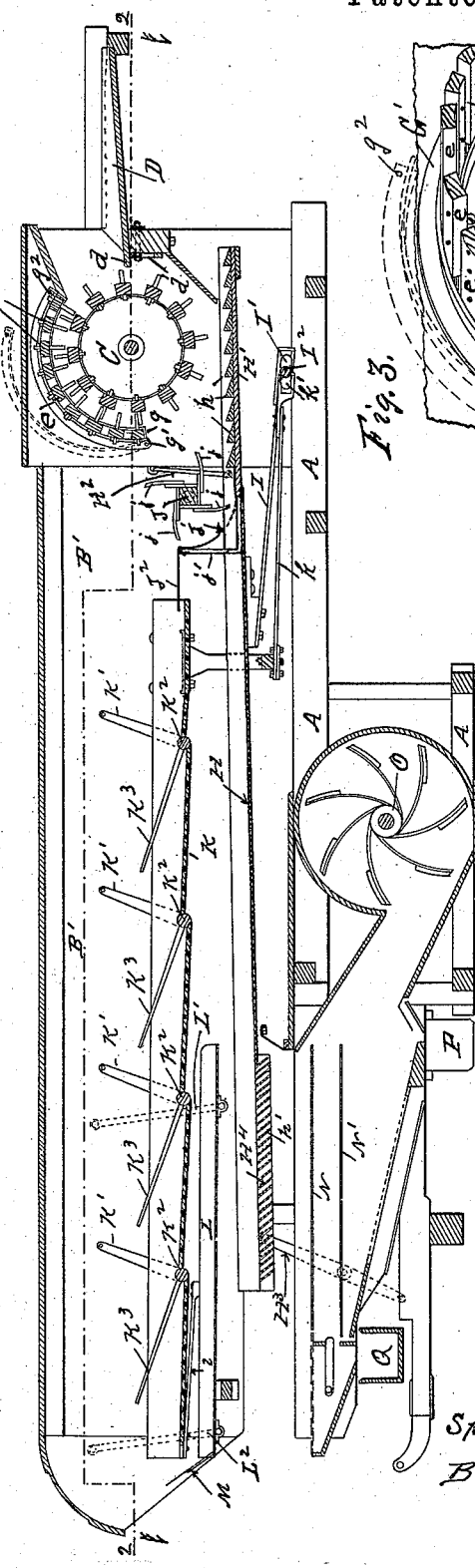
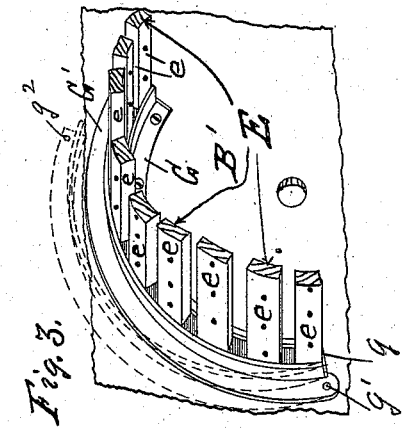
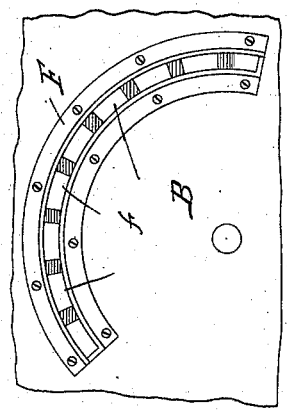
WITNESSES.
Porter Stafford
F. Einfeldt
INVENTOR.
Spencer F. Stafford
By J.C.Stingrover
Atty.

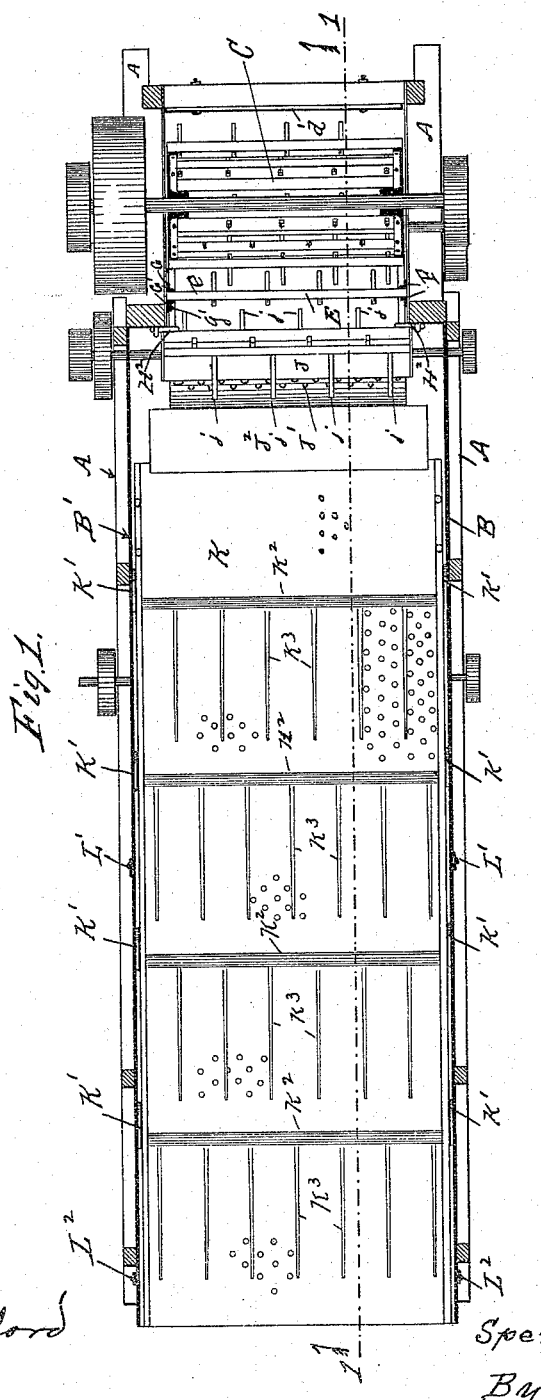

UNITED STATES PATENT OFFICE.

SPENCER F. STAFFORD, OF ERIE, PENNSYLVANIA.

BEAN-THRASHING MACHINE.

SPECIFICATION forming part of Letters Patent No. 547,189, dated October 1, 1895.

Application filed February 28, 1895. Serial No. 540,004. (No model.)

*To all whom it may concern:*

Be it known that I, SPENCER F. STAFFORD, a citizen of the United States, residing at the city of Erie, in the county of Erie and State of Pennsylvania, have invented certain new and useful Improvements in Bean-Thrashing Machines; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention consists in the improvements in bean-thrashing machines hereinafter set forth and explained, and illustrated in the accompanying drawings, in which—

Figure 1 shows a horizontal sectional view of my improved bean-thrashing machine on the line 2 2 in Fig. 2, looking in the direction of the arrows. Fig. 2 is a vertical section of my machine on the line 1 1 in Fig. 1, looking in the direction of the arrows. Fig. 3 is a perspective view of a section of the concave of the machine and means for securing one end thereof to the side of the machine. Fig. 4 is a view in elevation, showing a section of the side of the machine and mechanism for securing one end of the cancave bars thereto.

In the construction of bean-thrashing machines as heretofore made it has ordinarily been found necessary to use two thrashing-cylinders, as with the narrow concave ordinarily used it was found to be impossible to thrash all of the beans out of the pods on account of the slow speed at which it is necessary to run the cylinder to avoid breaking the beans, and great difficulty has been found in making a practical concave, so as to do the thrashing with a single cylinder. In the construction shown in the drawings and hereinafter described I have overcome these difficulties.

By means of my improved construction of the concave and its arrangement with relation to the cylinder I am enabled to thrash the beans properly with a single cylinder, and by means of an auxiliary reel or beater in the rear of and somewhat below the cylinder I am enabled to remove the thrashed bean-straw from the rear of the cylinder and deliver the same upon the shaker and carrier so rapidly and completely as to effectually prevent any choking or obstruction of the cylinder. These results, also, have heretofore been difficult to accomplish satisfactorily on account of the nature of the bean-vines being thrashed.

In the accompanying drawings, illustrating my invention, A is the framework of the machine, and B B' the sides thereof, which are of ordinary construction. In the front end of the frame I mount a cylinder C in the usual manner, which is provided with a feed-board D, the end of which $d$ next to the periphery of the cylinder is adapted to be adjusted up and down by means of a vertically-slotted support $d'$, adjustably bolted to the machine-frame. The concave E of the machine is above the cylinder C and extends around about one-third of the periphery of the cylinder. This concave E I make of bars $e$, one end of each of which bars enters slots or mortises $f$ in a curved frame F, secured to the inner surface of the side B of the machine. The other ends of the bars $e$ drop into open slots or mortises $g$ in the lower half G of the curved frame G G', secured to the side B' of the machine. The upper half G' of this frame is pivoted at its lower end $g'$ to the side B' of the machine, so that it can be raised up or swung back thereon, as illustrated in dotted lines in Figs. 2 and 3, when any one or more of the concave bars $e$ can be at once removed. When in place, the upper end of the section G' is secured by means of a bolt $g^2$, passing into the side B' of the machine. In this construction it will be seen that the concave E is above the cylinder C, which operates as an overshot cylinder, and that the bars of the concave can at any time be quickly and easily removed when desired. After passing through between the cylinder and concave, the material being thrashed passes down and is received upon a vibrating carrier H, the front end H' of which extends forward under the cylinder C. This portion of the carrier is provided with transverse lags $h$, which operate as the carrier vibrates to move the material deposited thereon toward the rear end of the carrier H, which extends nearly the whole length of the machine and is inclined from the front toward the rear end thereof. The carrier H is supported on links $H^2$ and $H^3$, pivoted to the machine-frame near the front and rear ends thereof, and is operated by a flexible pitman I, connected with a crank I' on the shaft $I^2$. A little in the rear of and below the lower end of the concave E there is a reel or beater J, the teeth $j$ of which operate close to the upper surface of the vibrating carrier H. This reel or beater J rotates in the opposite direction to that of the rotation of the cylinder C, and as the thrashed material passes down upon the portion H' of the carrier H from between the cylinder and the concave E directly in front of the reel or beater J the greater portion of the thrashed material is gathered up by the teeth $j$ of the reel or beater J and thrown upward and backward upon a longitudinally-vibrating screen-carrier K, mounted in the upper part of the machine-frame, while the loose beans and chaff therewith which are not so carried upward and backward by the action of the reel or beater J pass backward under and between the teeth $j$ of the reel or beater J through openings in the curved screen J', supported on angle-irons $j'$, secured to the sides of the screen H, and pass onward toward the distributer $H^4$, which forms the rear end of the carrier H, through which they pass downward to the screens of the fanning-mill hereinafter referred to.

The vibrating screen-carrier K, hereinbefore referred to, extends from within a short distance of the rear of the upper end of the curved screen J' nearly to the rear end of the machine, and extending from the upper end of the curved screen J' is an apron $J^2$, secured to said screen, which overlaps the front end of the vibrating screen-carrier K. This carrier K swings freely on links K', pivoted to the sides B and B' of the machine, and is operated by means of a flexible pitman $k$ and a crank $k'$ on the shaft $I^2$. To the lower ends of the links K' are secured transverse rods $K^2$, which operate as pivots connecting the lower ends of the links K' to the carrier K, and in these transverse rods $K^2$ are rearwardly-projecting teeth $K^3$, which, as the carrier vibrates in one direction, operate to raise the straw off of the bottom of the carrier and separate the beans from the straw, so that they will pass down upon the carrier H and the auxiliary vibratory carrier L. This carrier L is swung on links L' and $L^2$ under the rear end of the vibrating screen-carrier K and extends forward toward the front of the machine somewhat beyond the front end of the distributer $H^4$, forming the rear portion of the vibrating carrier H. This carrier L is also inclined toward the front end of the machine, so that it will deliver material falling thereon from the screen K upon the carrier H in front of the distributer $H^4$, and is operated by flexible connections $l$ between it and the rear end of the vibrating screen-carrier K. The distributer $H^4$, which forms the rear end of the vibrating carrier H, is formed of transverse slats $h'$, secured in the sides of the rear end of the carrier H, and operates to distribute the beans and chaff evenly over the screens of the fanning-mill hereinafter referred to.

In operation the bean-straw passes off of the rear end of the vibrating screen-carrier K over the adjustable tail-board M, secured to the rear end of the auxiliary vibrating screen L, and the beans and chaff pass down, as hereinbefore described, through the distributer $H^4$, from whence they fall upon screens N N', where the chaff is removed by a fan O in the usual manner, the cleaned beans passing downward into a delivery-spout P and the tailings into a tailing-spout Q, in the usual manner.

Having thus fully described my invention, so as to enable others to construct and operate the same, what I claim as new, and desire to secure by Letters Patent of the United States, is—

1. In a bean thrashing machine, the combination of the supporting frame, a thrashing cylinder mounted therein, and a sectional concave also mounted in said frame above and extending substantially one-third the distance around said cylinder, said concave being composed of a series of bars bearing suitable teeth, one end of each bar being mounted in a mortise in one side of the frame and its other end in an open slot or notch in the other side of the frame, said ends of said bars being removably secured in said open slot or notches by a hinged bar formed of a curvature corresponding to the curvature of said concave, whereby when closed it is adapted to clamp and lock said bars in place, and when open frees said ends and permits the removal of any one without disturbing the others, substantially as set forth.

2. In a bean thrashing machine, the combination of the supporting frame, the thrashing cylinder, the concave located above said cylinder, a rotary toothed reel or beater located behind and below the cylinder shaft with its teeth operating in close proximity to a vibratory carrier, said vibratory carrier extending in a substantially horizontal plane below said cylinder from a point a little in front thereof to near the rear end of the machine, and inclining slightly from front to rear, its front portion being provided with transverse carrier lags and its rear formed of transverse slats with openings between them for distributing the product to the winnowing machine below, a curved screen mounted on said carrier just behind said reel, a second vibratory carrier which is also a screen mounted above said first carrier behind said reel, its surface being substantially in line with the top of said curved screen from which an apron extends over the end of said screen carrier, an auxiliary vibratory carrier mounted under the rear end of said screen carrier and extending forward to a point in front of the distributer of said first named carrier, all substantially as described and for the purposes specified.

In testimony whereof I affix my signature in presence of two witnesses.

SPENCER F. STAFFORD.

Witnesses:
F. EINFELDT,
WM. P. HAYES.